May 22, 1956      E. W. RYALL      2,746,562

DEVICE FOR REMOVING LIQUID AND LIQUEFIABLE VAPORS FROM GAS

Filed Feb. 24, 1953

EDWARD W. RYALL,
INVENTOR.

BY Paul A. Weilein

ATTORNEY.

United States Patent Office 2,746,562
Patented May 22, 1956

2,746,562

DEVICE FOR REMOVING LIQUID AND LIQUEFIABLE VAPORS FROM GAS

Edward W. Ryall, Los Angeles, Calif.

Application February 24, 1953, Serial No. 338,318

4 Claims. (Cl. 183—67)

This invention relates to the separation of a liquid from a gas, and is more particularly concerned with novel apparatus for removing liquids and liquefiable vapors from a gas.

Industrial air compressor systems often accumulate undesirable quantities of liquids and vapors of liquefiable substances. In certain applications, as for example in the operation of paint spray guns, or where compressed air jets are employed for cleaning parts or materials, the accumulation of such liquid and vapors is particularly undesirable. Thus, one of the major problems encountered in this field is the removal of oil, water and water vapor from compressed air lines. Conventional commercial separators and filters employed for this purpose are not entirely satisfactory, since they are generally inefficient insofar as complete removal of liquefiable vapors, e. g. water vapor, from the gas is concerned.

One object of this invention is to provide a novel means for removing liquids and/or liquefiable vapors from a gas.

Another object of this invention is the provision of novel apparatus for removing oil and water from compressed air.

Yet another object of the invention is to provide a separator device which effects separation of liquids and condensation of liquefiable vapors from a gas under pressure containing the same, and absorption of the free liquids thus removed from such gas.

A still further object of the invention is to provide a separator device of the foregoing type, which is sturdy, efficient, inexpensive, and which may be easily constructed and serviced.

This invention possesses many other advantages and has other objects which may be made more easily apparent from a consideration of one embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

The foregoing objects are accomplished by the invention devices, wherein a gas under pressure, e. g., compressed air, containing liquids and liquefiable vapors such as oil, water and water vapor, is directed upon a suitable surface from a tube or nozzle so arranged with respect to such surface as hereinafter described, that separation of the liquids and condensation of these vapors will occur. Provision is also made for absorption of the free liquids so removed, including the resulting liquefied vapors, in an absorptive medium properly positioned in relation to such nozzle and surface. The device is constructed so as to allow the effluent gas to readily pass through it to the outside. For all practical purposes, use of the device results in substantially complete removal of the free liquids and liquefiable vapors in the gases passing therethrough.

Referring to the drawings:

Fig. 1 shows a perspective view of the component parts of the device, indicating the manner and sequence in which the component parts are assembled, one of such parts being broken away to show its internal structure;

Fig. 2 is a vertical sectional view of the assembled device; and

Fig. 3 is a transverse sectional view, taken on the line 3—3 of Fig. 2.

One embodiment of this invention, as shown in the drawings, includes a closed chamber 4 having a bottom wall 5, a cylindrical side wall 6 and a removable top wall or cover 7. The top wall is detachably secured in place by means of stud bolts 8 and wing nuts 9, there being a gasket 10 between the top wall and the cylindrical wall 6 to form a fluid tight seal.

Gas to be treated is introduced under pressure into the chamber 4, for example from a supply pipe 11 connected with an inlet 12 in the top wall 7. After the gas has been treated in the chamber, as will be hereinafter fully described, to separate the liquid and liquefiable vaporous components therefrom, the gas is discharged through an outlet 13 in the cylindrical wall 6, thence through a take off pipe 14.

Gas entering the inlet 12 passes through a nozzle 15 fixed to the top wall 7 so as to depend therefrom. The discharge opening 16 at the lower end of this nozzle is spaced from the bottom wall in a particular manner which will now be described.

It is desirable to provide a surface opposite the discharge opening 16 of the nozzle for collecting the liquid and liquefiable vapors separated in accordance with this invention, from the gas discharging through the opening 16. Accordingly, the bottom wall 5 is provided as here shown, with a circular collection surface 17 surrounded by an annular recess 18 formed between the surface 17 and the cylindrical wall 6. The discharge opening 16 is closely spaced from the center portion 17' of the surface 17 in order to form a restricted annular orifice 20 which causes a radial discharge jet of gas from the nozzle.

In discharging under pressure, from the discharge opening 16 of the nozzle 15, the gas will impinge upon the center portion 17' of the surface 17 and at the same time be discharged radially through the restricted orifice 20. The impact of the gas upon the surface 17' will cause a mechanical separation of liquid carried by the gas, but the main separation action takes place due to the rapid expansion and consequent cooling of the gas as it leaves the restricted orifice 20 and enters the larger space provided interiorly of the chamber 4. This cooling of the gas causes condensation of the liquid and liquefiable vapors and consequent collection thereof on the surface 17. This surface is also cooled by the expansion of the gas and so remains to aid in the condensation of the liquifiable vapors.

The gas, after being treated in this manner to free it of the liquid and liquefiable vapors, discharges through the outlet 13 in the manner which will be hereinafter described. The liquid deposited on the surface 17 is absorbed by a means which will also be hereinafter described.

It has been found that although the discharge opening 16 of the nozzle 15 must be relatively closely spaced from the collection surface 17, this spacing may be varied in accordance with certain factors, e. g., pressure, velocity, volume of gas being discharged and the nature of the gas being treated.

While the nozzle 15 has been shown in the present embodiment of this invention as cylindrical, it may be tapered from the top to the discharge end thereof, if desired, i. e., it may have a conical configuration. Moreover, this nozzle may be attached in any suitable manner to the cover, instead of being formed integrally therewith as shown in the drawing. Further, the collection surface 17 may be designed so as to slope downwardly from the center, if desired, to facilitate travel of the separated and condensed liquid by gravity, radially outwardly over the surface 17, although the force of the gas jet from the orifice 20 is sufficient for this purpose when the surface 17 is horizontal as seen in the drawing.

A cylindrical absorption and filter cartridge 21 is mounted in the chamber 4 so as to surround the nozzle 15 in circumferentially spaced relation therefrom. The lower end of the cartridge rests upon the collection surface 17 so that the liquid deposited on this surface readily will be absorbed. As here shown, the cartridge includes a roll 22 of absorptive material, such as paper, cloth, or other suitable material, wound around a tubular core 23 open at both ends. Any suitable medium which effectively will absorb the liquid and filter the gas may be employed.

The nozzle 15 extends through the core 23 in spaced relation thereto, so as to provide an annular main flow passage 24 having a comparatively large capacity. The gas discharged from the orifice 20 enters the lower end of the passage 24 and quickly expands and cools in the manner hereinbefore stated, thereby liberating liquids from the gas.

The liquid deposited on the surface 17 will be forced radially outwardly by the jet of gas from the orifice 20 and will flow over the surface 17 beneath the lower end of the roll 22 of absorptive material. As this absorptive material is in intimate contact with the surface 17, it will be apparent that the liquid readily will be absorbed thereby. The lower end of the core 23 may be notched or perforated as at 23' to facilitate the flow of liquid beneath the cartridge 21 into contact with absorptive roll 22.

The major portion of the effluent gas discharged from the orifice 20 will flow upwardly through the passage 24, thence laterally into a passage 25 provided between the top of the cartridge 21 and the top wall 7. From the passage 25 the gas will flow into an annular passage 26 formed between a cartridge-retaining shell 27 and the cylindrical wall 6 of the chamber 4. Openings 28 formed adjacent the upper end of the shell 27 afford a free flow of the gas into the passage 26 thence to the outlet 13. A sealing gasket 27' is disposed between the lower end of the shell 27 and the bottom wall 5 to prevent gas as well as liquid separated therefrom from being forced outwardly past the outer margin of the surface 17 and up between the shell 27 and the cylindrical wall 6 of the chamber 4.

A portion of the gas discharged from the orifice 20 will pass beneath the lower end of the core 23 and under the roll 22 of the cartridge 21. The roll 22 is composed of absorptive material which also serves as a filter and provides a filter passage communicating the orifice 20 or, in other words, the lower end of the passage 24, with the passage 25 extending across the top of the roll. This effluent gas which passes beneath the roll 22 due to the velocity of the jet issuing from the orifice 20, through the filter material into the passage 25, then flow through the openings 28 and passage 26 to the outlet 13. Thus, the passage 25 serves as a communication passage between the filter passage and the passage 26 as well as between the main passage 24 and the passage 26 leading to the outlet 13.

The lower end of the shell 27 is disposed in the recess 18, the shell being retained against lateral displacement by an annular shoulder 30 on the bottom wall 5 of the chamber 4. As this shell surrounds the cartridge 21, it is apparent that it will hold the cartridge in place on the surface 17.

The cartridge 21 is held against vertical displacement from seated contact with the surface 17 by means of spacing lugs 31 depending from the top wall 7 so as to contact the upper end of the cartridge. The removable cover 7 makes it possible readily to replace the cartridge 21.

It will now be apparent that the separator of this invention will provide for the desired separation.

I claim:

1. In a device for separating liquid from a gas: a closed chamber having an inlet and an outlet; means in said chamber providing a surface on which liquid is deposited from the gas; a nozzle connected with said inlet; said nozzle having a discharge opening disposed in close proximity to said surface adjacent the center of said surface to define therewith a restricted orifice through which gas is discharged from said nozzle against said surface and radially thereover, and a tubular absorptive member resting on said surface; said member surrounding said nozzle in circumferentially spaced relation thereto to define an annular flow passage communicating at one end with said orifice; said member being spaced from portions of said chamber to define a passage communicating the other end of said annular passage with said outlet; the discharge of gas from said orifice into said annular passage resulting in the deposit of liquid from said gas onto said surface; said absorptive member absorbing the liquid deposited on said surface.

2. In a device for separating liquid from a gas: a closed chamber having an inlet and an outlet; means in said chamber providing a surface on which liquid is deposited from the gas; a nozzle connected with said inlet; said nozzle having a discharge opening disposed in close proximity to substantially the central portion of said surface to define therewith a restricted orifice through which gas is discharged from said nozzle against said surface and radially thereover; a tubular absorptive member resting on said surface; said member surrounding said nozzle in circumferentially spaced relation thereto to define an annular flow passage communicating at one end with said orifice; said member being spaced from portions of said chamber to define a passage communicating the other end of said annular passage with said outlet; a shell surrounding said member; and means in said chamber for retaining said shell in position to maintain said member on said surface; the discharge of gas from said orifice into said annular passage resulting in the deposit of liquid on said surface; said absorptive member absorbing the liquid deposited on said surface.

3. In a device for separating liquid from a gas: a closed chamber having an inlet and an outlet; means in said chamber providing a surface on which liquid is deposited from the gas; a nozzle connected with said inlet; said nozzle having a discharge opening disposed in close proximity to said surface to define therewith a restricted orifice through which gas is discharged from said nozzle; and a hollow cylindrical member of absorptive material capable of filtering gas therethrough; said member having an imperforate hollow core open at both ends and surrounding said nozzle in spaced relation thereto to form an annular flow passage communicating at one end with said orifice; one end of said member contacting said surface; the side of said member and the other end thereof being spaced from walls of said chamber to define a second passage communicating the other end of said annular flow passage with said outlet; said member providing therethrough a filtering passage leading from said surface to said second passage for filtering that portion of the gas flowing past said core between the said member and said surface; discharge of gas from said orifice resulting in the flow of gas through said passages to said outlet and the deposit of liquid on said surface; said absorptive member absorbing the liquid deposited on said surface.

4. In a device for separating liquid from a gas: a closed chamber having an inlet and an outlet; means in said chamber providing a surface on which liquid is deposited from the gas; a nozzle connected with said inlet; said nozzle having a discharge opening disposed in close proximity to said surface to define therewith a restricted orifice through which gas is discharged from said nozzle; an absorptive member capable of filtering gas therethrough; said member having a hollow core surrounding said nozzle in spaced relation thereto to form an annular flow passage communicating at one end with said orifice; one end of said member contacting said surface for absorbing liquid deposited on said surface; a side of said member and the other end thereof being spaced from walls of said chamber to define a second passage communicating the other end of said annular flow passage with said outlet; said member providing therethrough a filtering passage leading from said surface to said second passage for filtering that portion of the gas flowing past said core between the said member and said surface; a cylindrical shell surrounding said member; and means in said chamber holding said shell in position to maintain said member on said surface.

References Cited in the file of this patent

UNITED STATES PATENTS

| | | |
|---|---|---|
| 1,243,472 | Wilson | Oct. 16, 1917 |
| 1,746,774 | Jenkins | Feb. 11, 1930 |
| 1,838,512 | Wilson | Dec. 29, 1931 |
| 1,871,546 | McClifferty | Aug. 16, 1932 |
| 1,983,100 | Schulz | Dec. 4, 1934 |
| 2,623,609 | Daniels | Dec. 30, 1952 |